C. O. LORENZ.
ELECTRICAL INDICATOR.
APPLICATION FILED NOV. 21, 1917.
1,432,346. Patented Oct. 17, 1922.
9 SHEETS—SHEET 1.
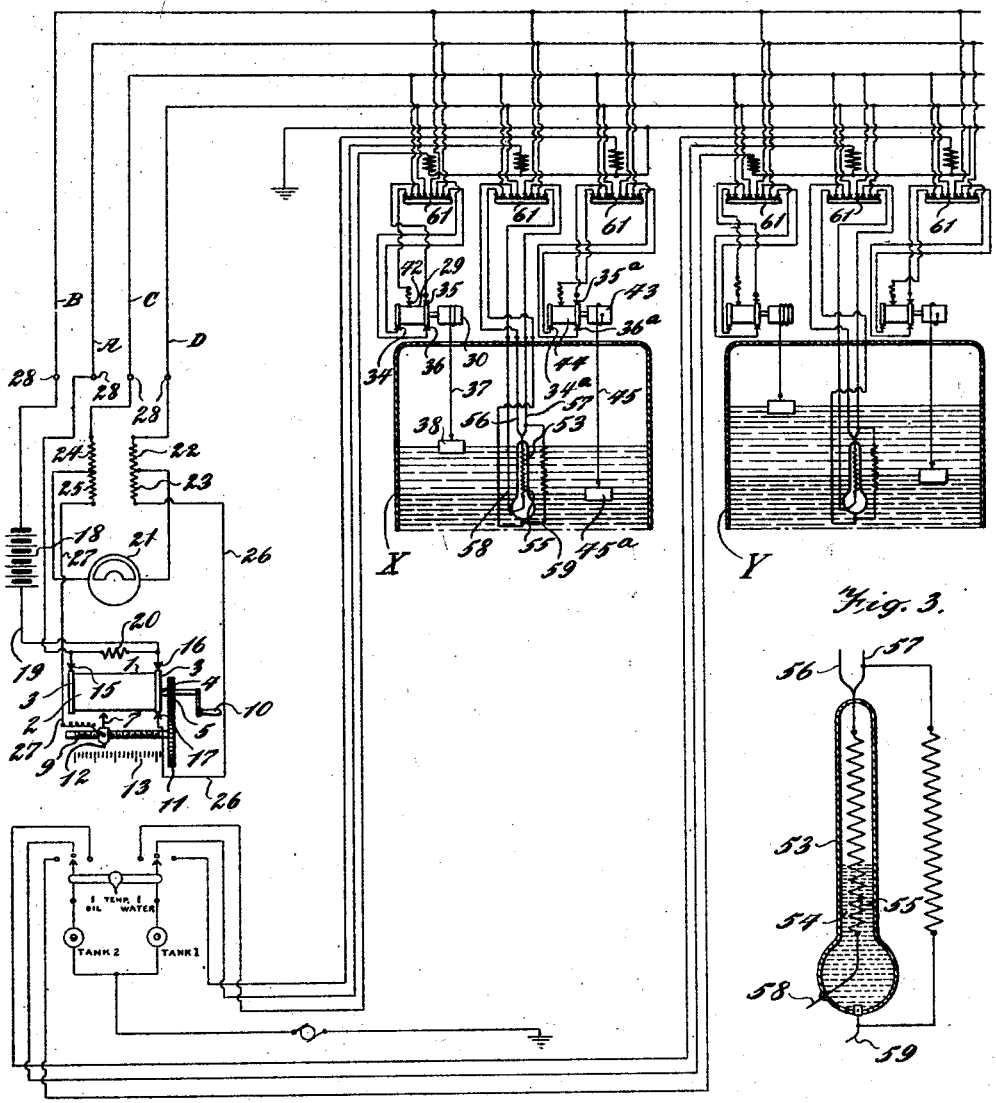
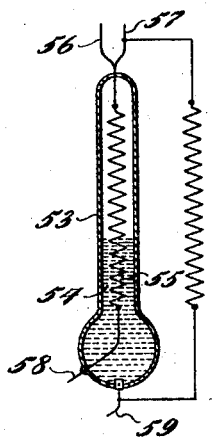
WITNESSES: INVENTOR.
Charles O. Lorenz
BY Gifford Bull
his ATTORNEYS

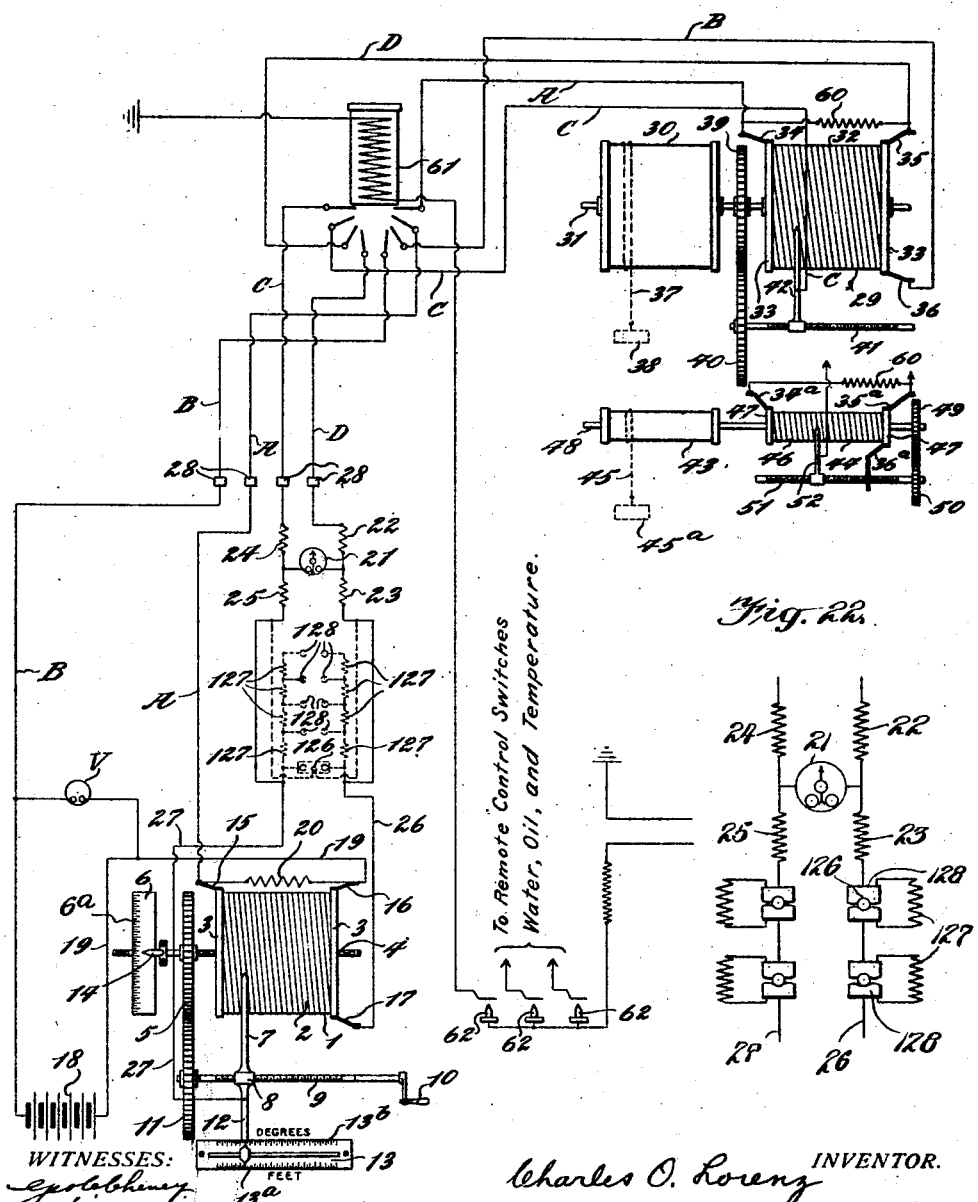

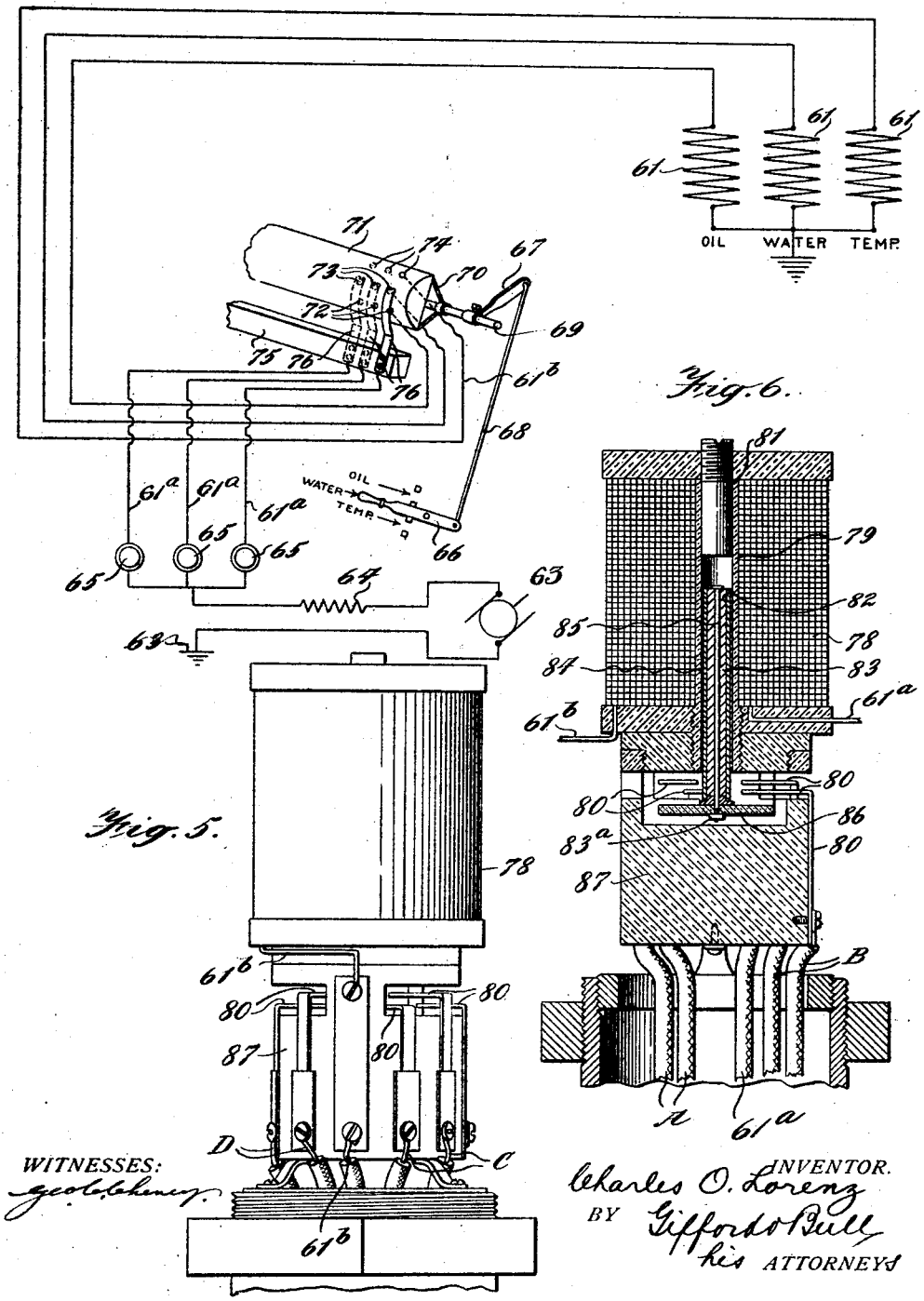

C. O. LORENZ.
ELECTRICAL INDICATOR.
APPLICATION FILED NOV. 21, 1917.
1,432,346.
Patented Oct. 17, 1922.
9 SHEETS—SHEET 4.
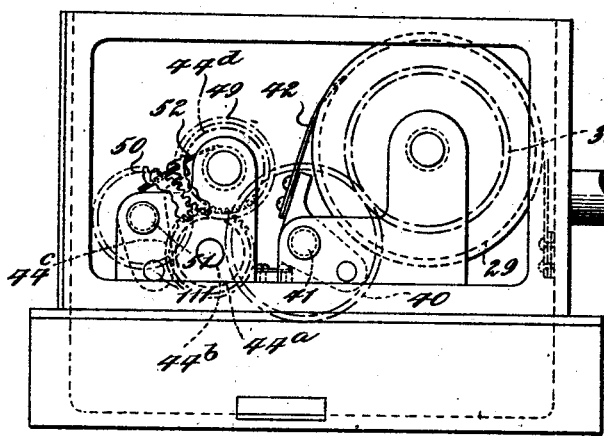
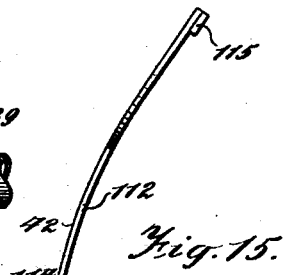
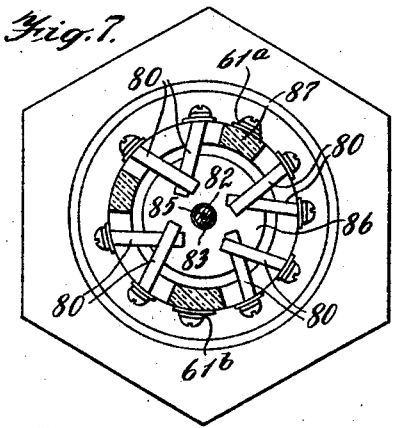
WITNESSES:
INVENTOR.
Charles O. Lorenz
BY
his ATTORNEYS

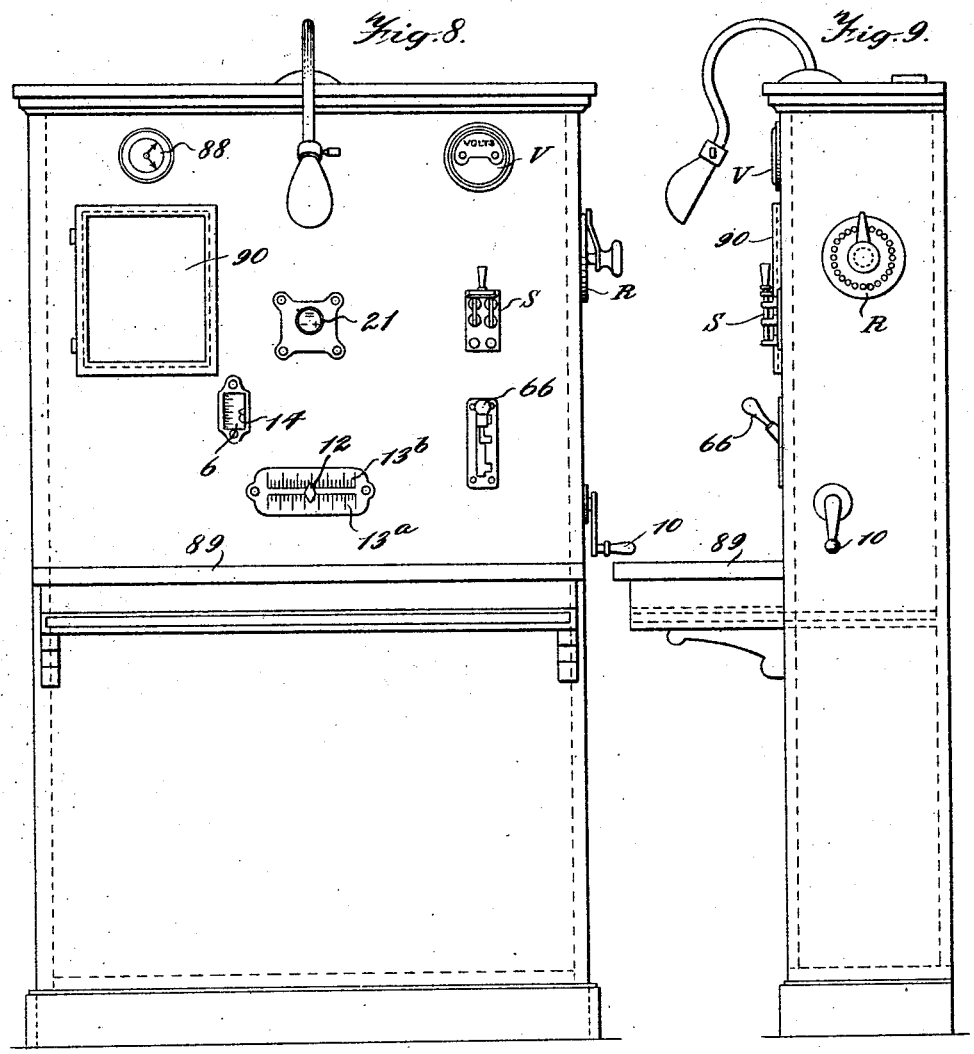

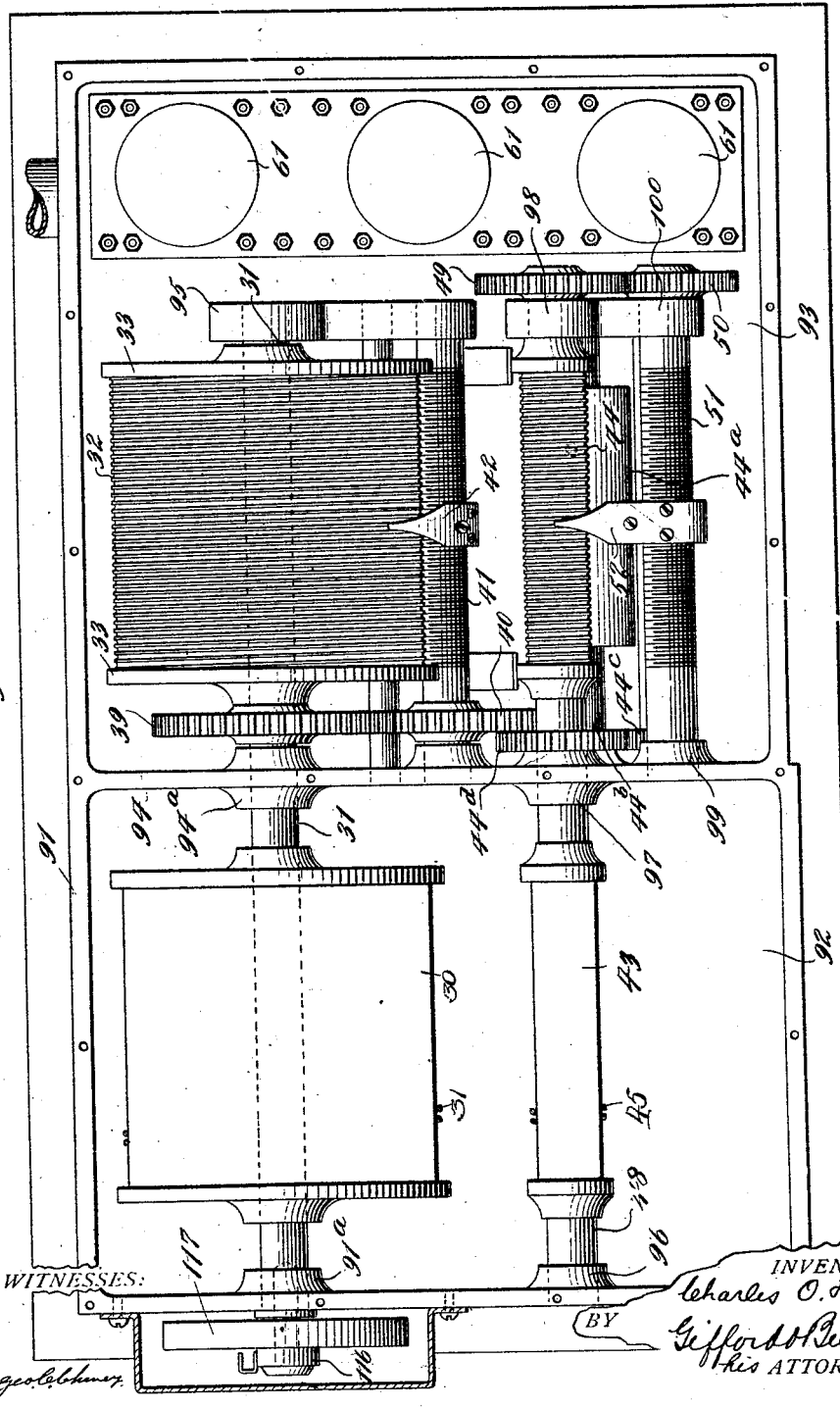

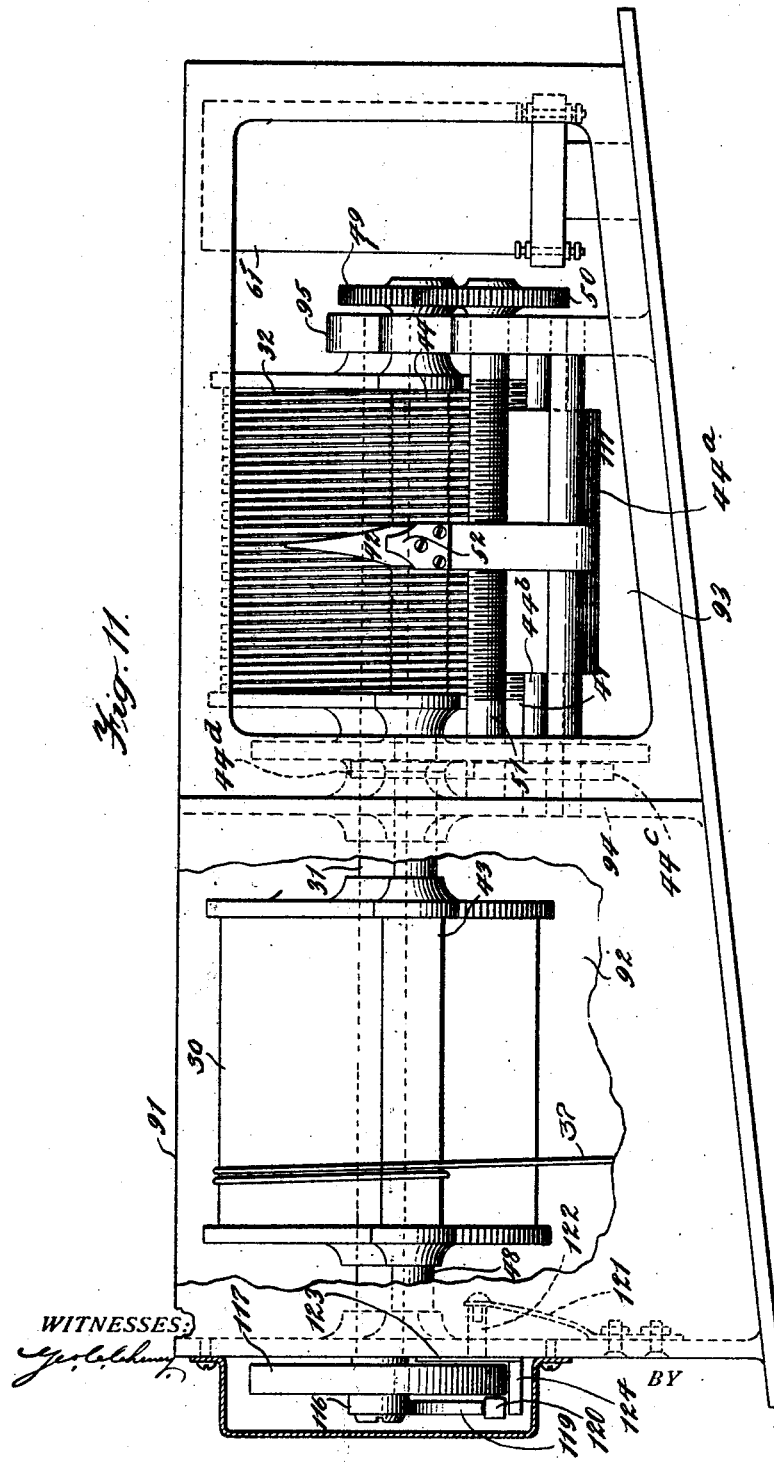

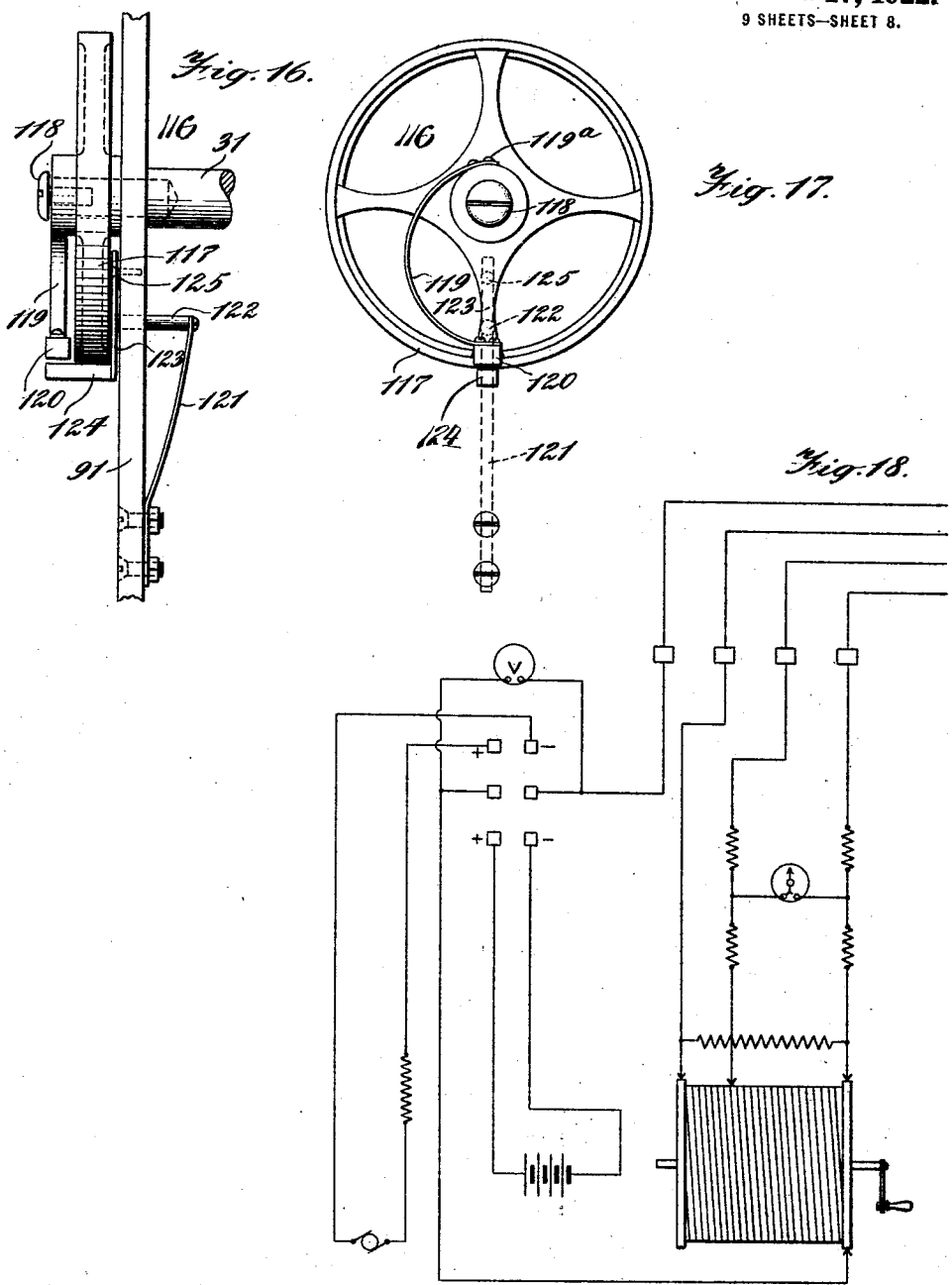

C. O. LORENZ.
ELECTRICAL INDICATOR.
APPLICATION FILED NOV. 21, 1917.
1,432,346.
Patented Oct. 17, 1922.
9 SHEETS—SHEET 9.
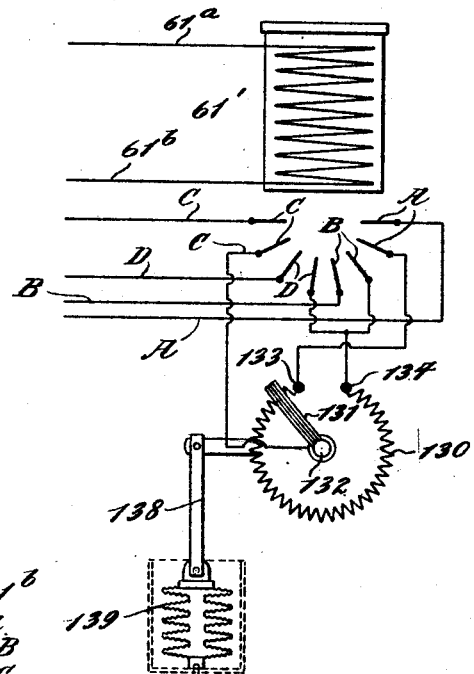
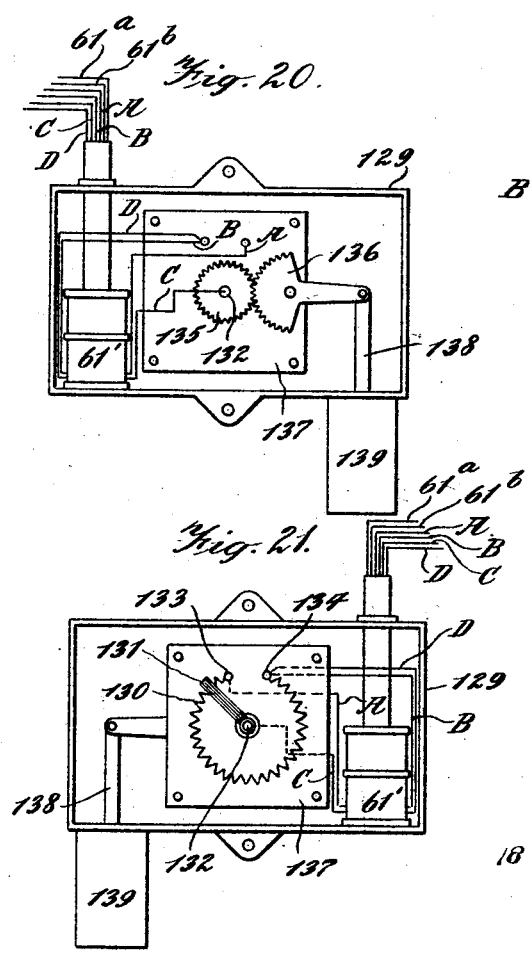
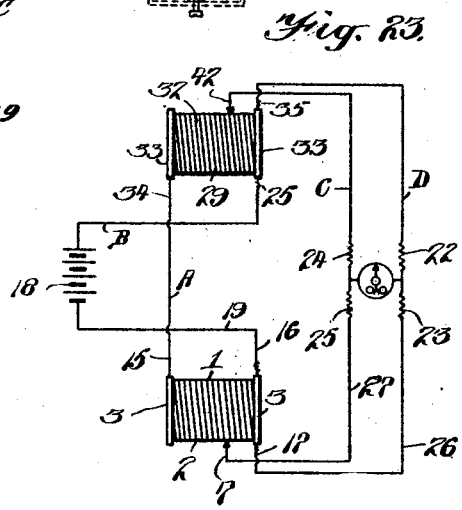
WITNESS:
INVENTOR
Charles O. Lorenz
BY
Gifford Bull
his ATTORNEYS Patented Oct. 17, 1922.

1,432,346

UNITED STATES PATENT OFFICE.

CHARLES O. LORENZ, OF PORT ARTHUR, TEXAS, ASSIGNOR TO THE TEXAS COMPANY, OF NEW YORK, N. Y., A CORPORATION OF TEXAS.

ELECTRICAL INDICATOR.

Application filed November 21, 1917. Serial No. 203,101.

*To all whom it may concern:*

Be it known that I, CHARLES O. LORENZ, a citizen of the United States, residing at Port Arthur, in the county of Jefferson and State of Texas, have invented certain new and useful Improvements in Electrical Indicators, of which the following is a specification.

My invention broadly and generally is a new and useful electrical indicator system for indicating the movement of a distant object.

One object of my invention is to provide an electrical indicating mechanism of such character that the movements of a distant object may be correctly and accurately noted regardless of variable factors, for example, such as changes in temperature and humidity.

A further object is to provide an improved and suitable means whereby an observing station may be placed in electrical communication with any number of transmitting stations.

A still further object of my invention is to provide such electrical mechanism that variations in distance between an observing station and the several transmitting stations will not militate against correct and accurate indications, so that an observing station may be placed in electrical communication with any number of transmitting stations, regardless of variations in distance between the observing station and the several transmitting stations, without thereby destroying the accuracy or correctness of the indications.

Other objects, as well as the peculiar advantages, of my system appear in the following description thereof.

My invention, while capable of general application in indicating the movement of a distant object, is particularly adapted for indicating fluctuations in liquid levels, such for example, as variations in the level of liquids in tanks or other receptacles, or variations in the tides in bodies of water.

In the accompanying drawings I illustrate an embodiment of my invention as applied to oil tanks, in which use of my invention I disclose it as serving three different functions: First: to indicate the oil level in an oil tank; second: to indicate the water level in an oil tank; third: to indicate the temperature of either liquid.

Fig. 1, is a diagrammatic view of an embodiment of my invention, parts being shown in elevation and parts in section, said embodiment being applicable for making readings of conditions at a plurality of remote points.

Fig. 2, is a diagrammatic view slightly enlarged over the view in Fig. 1, and showing the parts at the observing and transmitting points in greater and more complete detail.

Fig. 3 is a detail view of a device for ascertaining temperature by means of my invention.

Fig. 4 is a diagrammatic view and showing parts in perspective for making readings of conditions of any one or more of a plurality of conditions at one or more of a plurality of distant points.

Fig. 5 is a view in side elevation of a controlling switch.

Fig. 6 is a longitudinal central section through the switch shown in Fig. 5.

Fig. 7 is a section on the line 7—7 of Fig. 5.

Fig. 8 is a front view of an instrument case at the observing or receiving station.

Fig. 9 is a side elevation of the instrument case shown in Fig. 8.

Fig. 10 is a plan view, with the cover removed of the apparatus at the transmitting station.

Fig. 11 is a view in front elevation of the apparatus shown in Fig. 10, with the front wall of the casing removed.

Fig. 12 is a view in end elevation of the apparatus shown in Figs. 10 and 11, with an end wall of the casing removed.

Fig. 13 is a detail view of certain parts of the transmitting apparatus, in longitudinal section.

Fig. 14 is a view in front elevation of a contact member of the transmitting apparatus.

Fig. 15 is a side elevation of the member shown in Fig. 14.

Fig. 16 is a side view of a safety device.

Fig. 17 is an end view of the device shown in Fig. 16.

Fig. 18 is a diagrammatic view of a slightly modified circuit arrangement.

Fig. 19 is a detached and detailed diagrammatic view of another form of means for ascertaining temperatures.

Fig. 20 is a face view of the mechanism shown diagrammatically in Fig. 19; and

Fig. 21 is a view of the mechanism shown diagrammatically in Fig. 19 but from the opposite side from that shown in Fig. 20.

Figure 22 is a diagram showing a slight modification of one portion of the Figure 2 connections.

Figure 23 is a simple diagram showing the circuit connections in general.

It is to be noted that the movements, which, in this embodiment of my invention are noted at an observing station, are: First: the movements of a float resting upon the oil surface; second: the movements of a float resting upon the water surface; third: the movements of a column of mercury; fourth: the movements of a thermostat or similar instrument. But it is to be understood that my invention is not confined to the indication of these enumerated movements only; it is adapted to indicate many other movements, such as the movements of a telescope, an azimuth indicator; a gun or other apparatus, or many other movements that might be mentioned, but not necessary to describe or illustrate here. The invention is also capable of use for the purpose of ascertaining the depth of water in the holds of a vessel, or of ascertaining the draught of a vessel. In the latter, it only being necessary to provide a liquid receptacle in the vessel which is provided with means for opening it to the water in which the vessel floats, so that the receptacle may receive the water to the same level as that outside the vessel. The movements of any liquid conductor, such as mercury, or any mechanical movement capable of actuating my rotating drum and sliding contact, or equivalents thereof, may be observed by means of my indicator system and comes fully within the scope of my invention.

Referring to the drawings by characters of reference and particularly to Figures 1 and 2: At the observing station is an insulated drum 1 having wound upon its surface a definite number of convolutions of wire 2. At either end of the drum is an annular, circumferential contact 3, preferably made of a material which is a good conductor, such for example, as German silver. These annular contacts are connected to the ends of the coil of wire 2 wound on the said drum. The drum 1 is rotated by a shaft 4, on which it is mounted, on which shaft is placed a gear wheel 5, and also an indicator wheel 6, on the periphery of which is a scale 6$^a$ calibrated in inches and fractions thereof. A contact bar 7, having a threaded part 8, riding on a threaded shaft 9, is adapted to engage a single convolution of the coil 2 on drum 1. The threaded shaft 9 is rotatable by hand-crank 10 and is fitted with a gear wheel 11 meshing with the other gear wheel 5 on the drum shaft. An elongation 12 of contact 7 constitutes a pointer cooperating with the gauge 13, which gauge is calibrated on one side in feet and inches, as at 13$^a$, and on the other side in degrees of temperature, as indicated at 13$^b$ in the drawings. A stationary pointer 14 is placed over the revolving gauge wheel 6. It is apparent that by manually turning the crank 10 the gear wheels 11 and 5 are revolved, thereby rotating the drum 1 and gauge wheel 6, and at the same time thereby causing the contact bar 7 to engage severally and successively the convolutions of wire 2 on drum 1 and the pointer 12 to move along the gauge 13. The coil of wire on the drum 1 has electrical connections consisting in the spring contacts 15, 16 and 17 adapted to engage the annular contacts 3, and the travelling contact 7, as will be hereinafter described.

18 denotes a source of electric power, which may be a battery or any other suitable source of power. A volt-meter V may be placed in the circuit and a rheostat not shown may, if desired, be used to obtain the proper voltage. From the positive side of the source of power a conductor 19 extends to said contact 16. From the contact 15 is a conductor A which extends to the transmitting station, as will be hereinafter described. From the negative side of the source is conductor B, also extending to the transmitting station. The coil of wire on the drum 1 is equipped with a shunt 20 for the purpose of accurately calibrating the coil, as is hereinafter fully explained.

A balance indicating means 21, such as a sensitive galvanometer, is placed at the observing station, said indicator being connected to the four high resistance coils 22, 23, 24 and 25 to form a Wheatstone's bridge, the function of which is hereinafter explained. From contact 17 a conductor 26 extends to the indicator 21 through resistance 23. From contact bar 7 a conductor 27 extends through resistance 25 to indicator 21. From the indicator 21 extend the line wires C and D passing through resistance 24 and 22, respectively. The line wires B, A, C and D extend from the binding posts 28 to the transmitting station.

At the transmitting station, that is, for example, at the oil tank, are two drums 29 and 30, which for calibration purposes are preferably of equal diameters, and which are rotatably mounted on a shaft 31. The drum 29 is a duplicate of drum 1, being of the same diameter and having the same number of convolutions of wire 32 of the same resistance as the coil 2 on drum 1. It is equipped with similar circumferential annular contacts as shown at 33, which are engaged by the spring contacts 34, 35 and 36. The drum 30 carries a cable 37 on the end of which is suspended a float 38 capable of resting on the surface of the oil. On the shaft 31 is a gear wheel 39 meshing with another gear wheel 40 fixed to a threaded shaft 41 carrying the movable contact 42 which is adapted to engage a single convolution of the coil 29. It is apparent that as the liquid level in the tank fluctuates the float 38 rises and falls causing the cable to wind on drum 30 and unwind therefrom, thereby revolving the drum 30, the shaft 31, the drum 29 and the gear wheels 39 and 40, the rotating of the said shaft causing the contact 42 to move along the threaded shaft 41 and thereby severally engage the convolutions of coil 32.

At the tank station may also be arranged two other drums 43 and 44 used in determining the water level in the tank. Drum 43 carries a cable 45 on the end of which is suspended a float 45$^a$ of greater specific gravity than oil but of less specific gravity than water, so that it floats on the water surface in the tank. Drum 44 is insulated and is wound with wire 46 of the same resistance per foot as that on the drums 1 and 29. It is equipped with similar annular contacts as shown at 47. These two drums 43 and 44 may, if desired, be duplicates, respectively, of the drums 30 and 29. However since there is generally in oil tanks a much less depth of water than of oil, I prefer to construct these drums of smaller diameters, the diameters being preferably equal to each other, however, for calibration purposes. The two drums 43 and 44 are rotatably mounted on a shaft 48 a gear wheel 49 is mounted on the shaft 48 and meshes with another gear wheel 50 fixed on a threaded shaft 51 upon which is threaded and moves the contact 52 adapted to engage a single convolution of the coil 44. The mode of operation is the same as that of the oil level apparatus heretofore described, the contact 52 being caused by the movement of the float to engage severally the convolutions of coil 44. The fixed contacts corresponding to the contacts 34, 35 and 36, are shown respectively at 34$^a$, 35$^a$ and 36$^a$.

For noting the temperature I employ a glass tube 53 containing mercury 54. (See Fig. 3). Inside the tube is a wire coil or a graphite rod 55, contact wires 56 and 57 meet outside the tube and enter through the top thereof connecting with the coil or graphite rod therein. The contact wires 58 and 59 enter at the lower portion of the tube. The mercury column, actuated by variations in temperature, rises and falls along the coil or graphite rod. The tube and conductors thereto may be suitably housed in a protective casing or housing (not shown).

The coils 32 and 44 are each provided with suitable shunt coils 60, which coils are for the purpose of accurately adjusting the resistances of the coils 32 and 44 to a desired ohmage. In practice in the installation of my system the coil at the observing station is first calibrated with a suitable measuring instrument, the coil 20 being so adjusted as to give the coil 2 the desired ohmage. After having calibrated the coil 2 the various coils at the several transmitting stations are then calibrated with this coil 2, each distant coil having its resistance adjusted by means of its respective shunt 60. A further function of these shunts 60 is that they serve to prevent sparking of contacts.

The wire which is wound upon the several drums, as described, may be of any desired material. Copper wire, for example, may be used; however, since it is desirable to construct the drums with reasonably small diameters, I prefer to use a wire having a high resistance, and made preferably of a metal that is practically insensitive to temperature variations, such a metal, for example, as advance of Therlo. I have found that a wire of from one or two ohms resistance per foot gives good results.

The drum 1 is calibrated with the gauge 13 in any convenient manner, one foot of wire on drum 1 representing one foot on the gauge 13. The coil 2 at the observing station is calibrated with the coils at the several transmitting stations, having the resistance of a given unit of wire on drum 1, equal to the resistance of a given unit of wire in any of the coils 32 and 46 at the transmitting stations. The relation between the drums 29 and 30 is such that the winding or unwinding of a foot of cable on drum 30 causes the contact 42 to travel over one foot of the wire on 29. This relation may be attained preferably by having the drums on a common shaft or by any other suitable arrangement. The relation between drums 43 and 44 is likewise such that the movement of the float 45$^a$ to the extent of one foot causes the contact 52 to travel over one foot of coil 46. It is thus apparent that the contacts 42, 52 at the transmitting stations move along their respective coils in consonance with the movement of the floats 38, 45$^a$, one foot variation in liquid level being equal to one foot of the wire coils. Hence, whenever the contact 7 at the observing station is placed in the same position with reference to coil 1 as contacts 42, 52 at a transmitting station bear with reference to their coils 32 46, the gauges 13 and 6 will indicate the liquid level in feet, inches and fractions thereof. The electrical phenomenon by means of which an operator is made aware of this balance, or condition of similitude, is hereinafter explained.

The coil or graphite rod 55 in the temperature bulb 53 is calibrated with the coil 2 in any suitable manner, so that the gauge 13 may be graduated in suitable units of temperature.

Figure 2 shows my indicator system as applied to a single transmitting station and electrical connections are shown only between the observing station and coil 32. The observing station may, however, be placed in communication with the coil 46 and with the coil or graphite rod 55 in the temperature bulb 53, thus adapting the system to the indication of the oil and water levels and to the indication of the temperature. When employing the system for this threefold purpose remote control switches 61 may be used, one switch for oil, one for water and one for temperature, at each transmitting station. Push buttons 62 may be used to operate the switches.

Figure 4 shows a switch system suitable for use when determining, from a common observing station, the temperature and oil and water levels, of each of any number of tanks or receptacles. The switch circuit is provided with a suitable source of power 63 and is fitted with an appropriate resistance 64. For every tank there is a push button 65. A movable lever 66 is adapted to be placed in three different positions, one for oil, one for water and one for temperature. A lever 67 is connected to lever 66 by means of a rod 68. The lever 67 is adapted to rotate the shaft 69. A rotary sector 70 is fixed on the shaft 69 and supports an insulated member 71 which is provided with a plurality of contacts. There are three rows of these contacts, one for oil, as at 72, one for water, as at 73, and one for temperature, as at 74, and as many contacts in each row as there are tanks to be gauged. An insulated member 75 supports the spring contacts 76, which are arc shaped and are adapted to register with the contacts 72, 73, 74, one row at a time. 61 indicates the remote control switches, there being three at each tank, one for oil, one for water and one for temperature.

The operation of this switch system is apparent. The operator moves the lever 66 to the required position, whether for oil, water or temperature, and then presses the button 65 for the desired tank thereby energizing the proper remote control switch at said tanks.

Figure 1 shows a wiring diagram with an observing station in connection with two tank stations. In order to trace the various circuits energized in the operation of my system let us assume that operator desires to determine the oil level in tank X. He moves the lever 66 (see Fig. 4) to the position marked "oil" and thus moves the member 71 so as to bring the proper row of contacts 74, in contact with the fingers 76 and presses the button 65 for the tank X, thereby closing the following circuits.

From the source of power 63 for the switch circuit to the button for tank X, over the wire 61$^a$ to contact 76, to contact 74 and thence over the wire 61$^b$ to the remote control switch 61 for oil at the tank, thence through the solenoid coil of said switch and thence back to source of power by way of the ground. The energizing of the coil of switch 61 causes the line wires B, A, C and D to connect at that point, as will be subsequently more fully explained. Circuits are thereby closed as follows:

From the source of power 18 over the local wire 19 at the observing station to contact 16, to contact 3, through the coil 2 on drum 1 to contact 15 over line A to contact 34 at the transmitting station to contact 33, over coil 32 on drum 29 to contacts 33 and 36 and over line B back to the negative side of the source of power 18 at the said observing station.

A circuit is closed on either side of the galvanometer 21. One circuit extends from coil 2 to contacts 3 and 17 through conductor 26 and resistance 23 to indicator 21, thence through resistance 25 and over conductor 27 back to coil 2 through contact 7. Another circuit extends from contact 42 at the tank station, over line C to coil 24 at the observing station, through galvanometer 21 to coil 22, over line D back to contact 35, at the transmitting station.

It is readily seen that by means of my switch system the oil and water levels and the temperature in any number of tanks may be observed from a single observing station.

Referring to Figures 5, 6 and 7, I will describe this remote control switch: 78 is the solenoid coil which is wound on an insulated sleeve as at 79. The solenoid coil 78 is connected to the wires 61$^a$ and 61$^b$ of the switch circuit. A, B, C and D are the line wires, heretofore described, each line wire having a pair of contacts 80. Within the coil 78 but separated from it by the insulation 79 is a fixed core 81 which may be constructed of a single piece of iron or may be composed of laminated steel plates. Beneath this core 81 is a movable core composed of a hollow iron cylinder 82. A preferred construction for this core is to make it of a wood core 83 covered with a layer of wire 84 and having a small iron wire 85 extending through the center of the core. The latter construction is preferable as it is desirable to have the movable core of as light weight as possible. Secured to the base of the core 83 by a nut 83$^a$ threaded on the end of the wire 85 is an insulated disc 86, which when the solenoid is not energized rests upon the base 87, there being normally a slight space between the two cores. The base 87 is made of a suitable insulating material and supports the contacts 80 heretofore mentioned. The two segments of each line wire, A. B. C. and D, are arranged around the base 87 being secured by binding posts to their respective contact fingers 80. These spring contact fingers 80 extend upwardly along the sides of the base 87 and are arranged to project inwardly so that the contact points thereof rest normally slightly above the disc 86, as shown in the drawing. These contact fingers 80 are preferably made of platinum or tungsten. Each pair is so arranged that one contact thereof is slightly above the other, the lower spring contact being adapted to be moved toward the overlying one when the disc 86 is raised. (See Fig. 6.)

The operation of the switch is apparent from the drawing. When the current flows in the coil 78 the cores 81 and 83 are thereby magnetized and the movable core 83 is drawn up to meet the fixed core 81. The disc 16 carried by the movable core is thus drawn up against the lower or underlying contact fingers 80, pressing them against the upper fingers and connecting each pair of segments of the line wires A, B, C and D. When the current through the solenoid coil 78 is broken the movable core 83 and disc 86 drop back upon the support 87, and the spring contact fingers 80 are thereby parted, breaking the circuits in the said line wires.

Referring again to the accompanying drawings, Figure 18 shows an alternative arrangement at the observing station whereby by means of D. P. D. T. switches the system may be adapted to use either battery power or another suitable source of D. C. power.

Figures 8 and 9 represent front and side views, respectively, of the instrument case at the observing station. The drawing shows the indicator 21, the gauges 13$^a$, 13$^b$ and 14, the crank 10, the voltmeter V, the double-pole, double-throw switch S, the rheostat R. For the convenience of the operator a clock 88 may be mounted in the case, and a writing shelf 89. A place 90 for correction sheets is shown, these correction sheets being used in the determination of the water level, since oils vary in specific gravity, the water floats, if all were constructed uniformly, would not always rest in exactly the same positions.

The apparatus used at the transmitting station is housed in a case 91 placed at the top of the tank, as shown in Figures 10, 11 and 12. This case 91 is divided into two compartments 92, 93, one of which contains the cable drums 30 and 43, and the other of which contains the drums 32 and 44, the travelling contacts 42, 52 and the remote control switches 61. The latter compartment is securely insulated from the outside so that no vapor or fumes from the tank can enter. The shaft 31 is journalled in an end wall of the casing, as at 91$^a$, in the partition 94, as at 94$^a$, and in a suitable bearing 95 in the compartment 93. The shaft 48 of the drums 43, 44 is journalled in the end wall, as at 96, in the partition 94, as at 97, and in a bearing 98. The threaded shaft 41 turns in a bearing 99 in the partition 94, and a bearing 100, in the compartment 93.

In order to keep the cable on drum 30 drawn up taut a spring 106 is provided as shown in Figure 13. Into a socket 101 in one end of the shaft 31, by which shaft drum 29 is rotated, a loose shaft 102 is inserted. This loose shaft is held securely in position by means of the collar 103 thereon, inside the drum and engaging the head thereof, and a set screw 104 passing through the said collar and engaging the shaft. The screw 105 screws into the collar and to said screw is fastened one end of the spring 106, which is wound around the shaft 31, the other end of which spring is secured to the shaft 31 by means of screw 107.

Spring means is also provided for controlling the rotary movement of the drum 44 in the same manner as the drum 32 heretofore described, but I prefer to provide a separate drum 44$^a$, mounted on a shaft 44$^b$, journaled in the partition 94 and the bearing member 100. This shaft carries a gear 44$^c$ meshing with a gear 44$^d$ fixed to the shaft of the drum 44, as shown in Figure 10. This drum 44$^a$, its shaft and contained spring, may be constructed in the same manner as the drum 29, see Figure 13, and, therefore, additional description is not necessary.

Figures 14 and 15 show the details of the travelling contact 42 which is preferably constructed as follows: A brass member 108 has two apertures, 109, 110, as indicated in the drawing, the smaller one adapted for a guide rod 111 and the larger one for the threaded shaft 9 or 51. A spring member 112, made preferably of steel or phosphor-bronze, is secured to the brass member 108 by a pair of screws 113. Another screw 114 is for adjusting the tension of the spring member 112. The latter member 112 is suitably insulated from the brass member. At the tip of the spring member is a silver point 115 which is adapted to engage single convolutions of the wire coil on a drum.

A safety device indicated generally by reference character 116 in Figure 10 is provided to safeguard the apparatus in case the float cable should break. This safety device is shown in detail in Figures 16 and 17 in which 91 indicates the wall of case 116 and 117 is a wheel secured to and rotated by shaft 31. 118 is a screw holding the wheel 117 on shaft 31. A curved steel spring 119 is fastened to the hub of wheel 117, as at 119$^a$, and on the end of this spring is secured a metal weight 120. A spring 121 is secured to the wall of case 91, the tension of which spring is adapted to be exerted on a steel pin 122, which pin extends through an aperture in wall 91. A trip lever, consisting of a lever 123 and a contact block 124, is pivoted on screw 125. The lever 123. is normally in position over the aperture through which pin 122 extends through the case wall. The adjustment of these several elements is such that normally the lever 123 prevents the pin 122 from coming between any of the spokes 125 of the wheel 117. As long as the wheel 117 is either stationary or is slowly rotated this normal condition ensues. But should the wheel 117 rotate rapidly, which would be the case if the cable on drum 30 should break, the rapid rotation of said wheel would cause the weight 120 to fly out and engage the block 124. The lever 123 would thus be pushed away from its contact with pin 122, and the tension of spring 121 would cause the pin 122 to be forced toward the wheel 117 so as to engage the spokes 125 thereof and prevent the further rotation of the wheel 117 and shaft 31.

It is understood that there are various ways in which the fluctuations of a float may be made to vary the positions of a contact with reference to an electric coil or other resistance and the drums as shown and described herein are intended to be illustrative of any suitable means for accomplishing the same purpose.

In order that the principle of my invention may be more readily comprehended I show in Figure 23, a simplified wiring diagram. It will be seen that the coils 32 and 2 are connected in series. Assuming that the conductor 19 runs from the positive side of the battery 18, a current will flow over the conductor 19 to contact 16, thence over the coil 2 to contact 15, thence over conductor A to contact 34, thence over the coil 32 to contact 25 and by means of conductor B back to battery 18. It is to be noted that since the coils 2 and 32 are connected in series the same amount of current will flow through each. It is further to be noted that I do not, in the operation of my system, cut in or out from the circuit any turns of these coils, each convolution of each coil is at all times within the circuit. The sensitive indicator 21 is shunted with resistances 22, 23, 24 and 25. Leads 26 and 27 extend from the indicator to the observing station and are provided with contacts 17 and 7 respectively. The leads C and D to the transmitting station are provided with contacts 42 and 35 respectively.

In order to obtain indications by my system, it is necessary to balance the drop in potential across certain convolutions of the two coils 32 and 2. To do this, the drum 1 containing the coil 2 is manually rotated until the moving contact 7 is in the same position with reference to coil 2 as the contact 42 at the transmitting station is with reference to coil 32. When there is a greater drop in potential over the convolutions of one coil, between the lead wire contacts, than there is over the convolutions of the other coil between its lead wire contacts, the needle of the indicator will deflect and on the other hand when the drop is the same on both coils the needle will stand at zero. Now the drop over a given number of convolutions on one coil is the same as the drop over the same number of convolutions on the other, since both coils are connected in series, hence when the indicator needle is at zero it indicates that the movable contacts are in the same position on both drums.

It is readily seen that a particular advantage of my system resides in the fact that variations in resistances of the line wires A and B to the several transmitting stations will not affect the determination of a correct balance. The resistance of A and B does not affect the system in any way, one wire may be of one substance and the other of another substance of a greatly different resistance and the distances of the line wires A and B to the several transmitting stations may vary greatly, but since the two coils are connected in series the amount of current in each coil is the same, and the drop over a given number of convolutions of the coil at the observing station is equal to the drop over the same number of convolutions of the coil at any of the transmitting stations.

Assume now that an operator undertakes to determine the liquid level, say of the oil of a distant tank. The fluctuations of this liquid level will have moved the contact 42 on drum 29 to a certain position, which we will suppose to be that shown in Figure 2. The contact 7 on drum 1 at the observing station is in a different position with reference to coil on drum 1 than contact 42 at transmitting station is with reference to the coil on drum 29. The operator at the observing station is made aware of this fact by the deflection of the galvanometer needle. He thereupon manually rotates the drum 1 by turning the crank 10 until the needle of the galvanometer stands at zero. This indicates that the drop in potential between the lead wire contacts 35 and 42 on drum 29 is the same, as the drop between the lead wire contacts 17 and 7 on drum 1, or in other words, that there are the same number of convolutions between these respective lead wire contacts. When the operator has thus attained this balance he notes the readings on the gauges 6 and 13, and obtains the liquid level in feet, inches and fractions thereof.

In order to obtain correct readings by the instrument 21, it is necessary that the total resistances of the leads on the transmitting side of the instrument shall be, not necessarily the same, but somewhat the same, as that of the leads on the observing side. It is understood that differences in the length of the leads C and D to the various transmitting stations will vary the resistance on the transmitting side, and hence would throw the needle more or less out of balance. By inserting in the leads on both sides of the instrument a comparatively high resistance as 22, 23, 24 and 25 the variations in resistance due to any reasonable differences in length of the leads become negligible. For example, I may say that by providing resistances 22, 23, 24 and 25 of 10,000 ohms each it is possible to obtain extremely accurate readings, even though the distances to the transmitting stations may vary from a few feet to perhaps a mile or so. However, in case the distances to the several transmitting stations should have a considerable variance, for example 5, 10 or 15 miles or so, it is convenient to insert on the observing side, adjustable resistances as illustrated in Figure 22. These adjustable resistances are designated by 127, the contact thereto by 128 and the contact plugs by 126. When using the instrument for ordinary distances each of the plugs 126 would be inserted in the contacts 128, causing the current to flow, by means of these contacts, directly from the line 26 to the coil 23 and from the line 27 to the coil 25. In case it was desired to use the instrument in connection with a transmitting station at a greater distance one or more of the plugs 126 would be withdrawn, thus causing the current to pass through one or more of the resistance coils 127. In this way the resistance of the leads on the transmitting side may be kept somewhat approximately equal to that on the observing side. The coils 22, 23, 24 and 25 also serve the purpose of protecting the sensitive instrument 21.

The balancing of the coils on the drums 1 and 44 used in obtaining the water level, works on the same principle. Likewise with the temperature indicator, the mercury 54 taking the place of the travelling contact 42 or 52 used in the rotating drums, and the drop between the top of the mercury column 54 and contact 35 is balanced with the drop between contacts 17 and 7 at the observing station.

In Figures 19, 20 and 21, I have shown an alternative form of means for ascertaining the temperature of liquids and which is designed to be located at the transmitting station. This means consists of an air and liquid tight casing 129 supported at a suitable point inside the tank or other liquid receptacle, in which casing is mounted a switch 61′ which is constructed and wired the same as the switch 61 heretofore described, and which controls circuit leads A, B, C and D, corresponding to those similarly designated heretofore. Also located in the casing 129 is a resistance wire or coil 130 which is traversed by a contact arm 131 mounted on a shaft 132 concentric to the resistance wire. The contact arm is connected to the circuit lead C controlled by switch 61′. The resistance wire is of the same length and the same resistance as the wire mounted on the drum at the observing station, as heretofore described. The ends of this coil are connected by leads 133 and 134, respectively, with the contacts A, B and D of the switch 61′, so that proper electrical connection is made between the resistance wire 130 and the coil on the drum when the coil of the switch is energized. On the end of the shaft 132 is a gear 135 with which meshes a segment 136 pivotally mounted on the base plate 137 which supports the resistance wire, which segment is provided with an arm connected to the upper end of a plunger 138, the lower end of which is connected to the upper one of a series of hollow communicating thermostatic disks which contain an oil or any suitable fluid. The arrangement is such that the disks expand or contract due to changes in temperature and through the connecting levers and gearing described move the contact arm 131 around the resistance wire 130 so that greater or less length thereof is placed in circuit with the coil on the drum at the observing station. In using this temperature device the drum at the observing station and the movable contact member 7 thereon are operated in the same manner as heretofore described when using the form of temperature indicator shown in Figures 1 and 3. The thermostatic disks are preferably contained in a cup or casing 139 closed to the surrounding liquid and which is a good conductor of heat, for example, copper or brass.

What I claim and desire to secure by Letters Patent of the United States, is:—

1. A telemetric system comprising a circuit including a suitable source of electric energy and a pair of resistances connected in series circuit relation across the terminals of said source, an electric balance indicator having connections to said circuit including adjustable connections to said resistances, one of which is automatically adjustable in response to the movement to be measured and the other of which is adapted to be adjusted to a corresponding position as determined by the balance indicator.

2. A telemetric system comprising a suitable source of electric energy, an electric balance indicator, a pair of like resistances connected in series circuit relation across the terminals of said source, connections from the electrical balance indicator to corresponding fixed points in the resistances, and adjustable connections from said balance indicator to the respective resistances, one of said connections being automatically adjusted in response to the movement to be measured, and the other being adapted to be adjusted to a corresponding position as determined by the balance indicator.

3. A telemetric system comprising a source of electric energy, an electric balance indicator adapted to indicate a difference in the drop in resistance, a resistance coil having a contact adapted to be adjusted with reference thereto in response to the movement of a distant object, a similar resistance coil connected in series relation to the first across said source of energy and having an adjustable contact and a calibrated measuring device arranged to indicate the position of said contact, connections from the electric balance indicator to predetermined fixed points in the coils and connections from the electric balance indicator to the adjustable contacts of the respective coils.

4. In an indicator system, a resistance coil at an observing station and a resistance coil at a transmitting station connected in series with a source of electric energy, a movable contact engaging the resistance coil at the observing station, manually operable means for varying the position of said contact with relation to said resistance coil, a movable contact engaging the coil at the transmitting station, variable actuating means for altering the position of said last-named contact with relation to its resistance coil, a fixed contact for each resistance coil and balance indicating means in a circuit including said movable contacts and said fixed contacts.

5. An indicator system for indicating the levels of liquids lying in strata and differing in specific gravity, a plurality of floats adapted to rest on the surfaces of said liquids, a plurality of resistances, an adjustable contact for each of said resistances, means actuated by said floats for varying the position of said adjustable contacts with respect to the resistances, a resistance at an observing station, an adjustable contact engaging said resistance, a source of electrical energy, means whereby the resistance at the observing station may be placed in series circuit relation across the terminals of said source severally with the other resistances, and balance indicating means having leads to the resistance at the observing station and leads adapted to be placed in communication severally with the other resistances, said leads including said adjustable contacts.

6. An indicator system for indicating the levels of liquids lying in strata and differing in specific gravity, a plurality of floats adapted to rest on the surfaces of said liquids, a plurality of drums each having a resistance coil thereon, a movable contact for each of said coils, means actuated by said floats for rotating said drums and varying the position of said contacts relative to the coils, a drum at an observing station having a resistance coil thereon, a movable contact engaging the last-named coil, means for rotating the last-named coil and moving said contact, a source of electric energy, means whereby the coil at the observing station may be placed in series circuit relation across the terminals of said source severally with the other coils, and balance indicating means having leads to the coil at the observing station and leads adapted to be placed in communication severally with the other resistances, said leads including said movable contacts.

7. In an indicator system, a rotatable coil at an observing station and a rotatable coil at a transmitting station connected in series with a source of electric energy, a movable contact engaging the coil at the observing station, manually operable means for varying the position of said contact with respect to said coil, a movable contact engaging the coil at the transmitting station, a drum, a float, a connection between said drum and float whereby the drum is caused to rotate in response to movements of the float, means whereby the position of the movable contact at the transmitting station is altered with respect to the coil at the transmitting station in response to the rotation of the drum, a fixed contact for each coil and balance indicating means in a circuit including said movable contacts and said fixed contacts.

8. In an indicator system, a rotatable coil at an observing station and a rotatable coil at a transmitting station connected in series with a source of electric energy, a movable contact engaging the coil at the observing station, manually operable means for varying the position of said contact with respect to said coil, a movable contact engaging the coil at the transmitting station, a drum, a float, a line connecting said drum and float and resilient means tending to rotate said drum, means for preventing the rotation of the drum in the event said line is abnormally slackened, means whereby the position of the movable contact at the transmitting station is altered with respect to the coil at the transmitting station in response to the rotation of the drum, a fixed contact for each coil and balance indicator means in a circuit including said movable contacts and said fixed contacts.

9. In an indicator system, a resistance at an observing station and a resistance at a transmitting station connected in series with a source of electrical energy, a movable contact engaging the resistance at the observing station, adjustable means for altering the position of said movable contact with respect to said resistance, a movable contact engaging the resistance at the transmitting station, automatic means for altering the position of said contact with respect to said resistance, and balance indicating means in circuit with said movable contacts.

In testimony whereof I have hereunto signed my name in the presence of two subscribing witnesses.

CHARLES O. LORENZ.

Witnesses:
E. M. LOCKWOOD,
C. G. HEYLMUN.